United States Patent
Nalawadi et al.

(10) Patent No.: US 9,325,579 B2
(45) Date of Patent: *Apr. 26, 2016

(54) ISOCHRONOUS DEVICE COMMUNICATION MANAGEMENT

(71) Applicant: Intel Corporation, Santa Clara, CA (US)

(72) Inventors: Rajeev K. Nalawadi, El Dorado Hills, CA (US); Mark P. VanDuesen, Chapin, SC (US)

(73) Assignee: Intel Corporation, Santa Clara, CA (US)

(*) Notice: Subject to any disclaimer, the term of this patent is extended or adjusted under 35 U.S.C. 154(b) by 306 days.

This patent is subject to a terminal disclaimer.

(21) Appl. No.: 13/896,736

(22) Filed: May 17, 2013

(65) Prior Publication Data

US 2013/0250972 A1    Sep. 26, 2013

Related U.S. Application Data

(63) Continuation of application No. 12/814,731, filed on Jun. 14, 2010, now Pat. No. 8,462,811, which is a continuation of application No. 10/699,242, filed on Oct. 30, 2003, now Pat. No. 7,808,895.

(51) Int. Cl.
 *H04L 12/24* (2006.01)
 *H04L 12/12* (2006.01)
 *H04L 29/06* (2006.01)

(52) U.S. Cl.
 CPC ............ *H04L 41/0896* (2013.01); *H04L 12/12* (2013.01); *H04L 29/06027* (2013.01)

(58) Field of Classification Search
 CPC .................................................. H04L 41/0896
 See application file for complete search history.

(56) References Cited

U.S. PATENT DOCUMENTS

| | | | |
|---|---|---|---|
| 5,754,798 A | 5/1998 | Uehara et al. | |
| 5,805,597 A * | 9/1998 | Edem | 370/445 |
| 5,894,577 A | 4/1999 | MacDonald et al. | |
| 6,009,488 A | 12/1999 | Kavipurapu | |
| 6,151,334 A | 11/2000 | Kim et al. | |
| 6,185,632 B1 * | 2/2001 | Berkema | 710/20 |
| 6,288,896 B1 | 9/2001 | Hsu | |
| 6,745,264 B1 | 6/2004 | Luke et al. | |
| 6,820,150 B1 * | 11/2004 | Joy et al. | 710/110 |
| 7,808,895 B2 | 10/2010 | Nalawadi et al. | |
| 8,462,811 B2 | 6/2013 | Nalawadi et al. | |

(Continued)

OTHER PUBLICATIONS

Intel Corporation, Non final Office Action dated Nov. 20, 2009; U.S. Appl. No. 10/699,242.

(Continued)

*Primary Examiner* — Brian D Nguyen
*Assistant Examiner* — Toan Nguyen
(74) *Attorney, Agent, or Firm* — Patent Capital Group

(57) ABSTRACT

Various embodiments of the invention relate to apportioning a total memory bandwidth available for a time period amongst a plurality of bandwidth requests according to a power managed profile. In addition, isochronous data transmission may be appended together and transmitted according to a data transmission policy, wherein the policy may include transmitting the appended isochronous data during an opportunistic data transmission, or during a time identified for transmitting a combined isochronous data transmission, but prior to a time delay compliance limit for isochronous requirements.

24 Claims, 6 Drawing Sheets

(56) References Cited

U.S. PATENT DOCUMENTS

| | | |
|---|---|---|
| 2001/0028780 A1 | 10/2001 | Na et al. |
| 2002/0052990 A1 | 5/2002 | Chan et al. |
| 2002/0152318 A1* | 10/2002 | Menon et al. ............ 709/231 |
| 2003/0206520 A1 | 11/2003 | Wu et al. |
| 2004/0001495 A1* | 1/2004 | Knapp et al. ............ 370/400 |
| 2004/0230729 A1 | 11/2004 | Ho et al. |
| 2005/0044429 A1 | 2/2005 | Gaskins et al. |
| 2005/0071698 A1 | 3/2005 | Kangas |
| 2005/0094665 A1 | 5/2005 | Nalawadi et al. |
| 2010/0278193 A1 | 11/2010 | Nalawadi et al. |

OTHER PUBLICATIONS

Intel Corporation, Non final Office Action dated Apr. 29, 2009; U.S. Appl. No. 10/699,242.
Intel Corporation, Non final Office Action dated Jan. 23, 2009; U.S. Appl. No. 10/699,242.
Intel Corporation, Non final Office Action dated Apr. 16, 2008; U.S. Appl. No. 10/699,242.
Intel Corporation, Non final Office Action dated Jul. 2, 2007; U.S. Appl. No. 10/699,242.
Intel Corporation, Final Office Action dated Mar. 22, 2010; U.S. Appl. No. 10/699,242.
Intel Corporation, Final Office Action dated Oct. 3, 2008; U.S. Appl. No. 10/699,242.
Intel Corporation, Final Office Action dated Oct. 3, 2007; U.S. Appl. No. 10/699,242.
Tanenbaum, "Computer Networks", *Third Edition*, (1996), 469.
Non-Final Office Action in U.S. Appl. No. 12/814,731 mailed on Jul. 17, 2012.
Notice of Allowance in U.S. Appl. No. 12/814,731 mailed on Feb. 11, 2013.

* cited by examiner

ISOCHRONOUS DEVICE COMMUNICATION MANAGEMENT

CROSS REFERENCE TO RELATED APPLICATION

This application is a Continuation of U.S. patent application Ser. No. 12/814,731, filed Jun. 14, 2010, now issued as U.S. Pat. No. 8,462,811, which application is a Continuation application of U.S. patent application Ser. No. 10/699,242, filed Oct. 30, 2003, now issued as U.S. Pat. No. 7,808,895 on Oct. 15, 2010.

FIELD

Communication of isochronous data.

BACKGROUND

Isochronous data is defined as time dependent data that must be delivered within certain time constraints, but unlike synchronous data, need not be delivered only at specific intervals. In addition, isochronous data is unlike asynchronous data which can be transmitted at random intervals. Moreover, isochronous software applications may send isochronous data to and from sensors and transducers, such as video displays, video cameras, audio microphones, audio speakers, and data repositories or sources such as a memory modules. For example, multimedia streams may require an isochronous transport mechanism to insure that video data is delivered fast enough to enable each frame to be displayed at its associated render time. The isochronous transport mechanism may insure that audio data is delivered within time constraints necessary to prevent buffer under-runs and audible errors at the codec and speakers. Therefore, isochronous applications for transmditting isochronous data to and from isochronous devices require guaranteed bandwidth and deterministic latency between the isochronous transmitting and receiving devices In a power managed profile of a digital electronic system, support of isochronous applications may require more power than support of interrupt driven activity such as asynchronous applications or activity initiated asynchronously. For example, a laptop computer or a handheld device using battery power may be unable to support a power managed profile to maximize battery life and provide adequate isochronous communications for its isochronous devices. Specifically, the laptop computer or handheld device may exceed the power managed profile when powering components (e.g., such as a processor, memory, processor logic and memory controller, chipset logic for handling device, data communication bus, and the isochronous device) as necessary to provide the required guaranteed bandwidth and deterministic latency for transmitting isochronous data within the time constraints required by the isochronous devices.

BRIEF DESCRIPTION OF THE DRAWINGS

Various features, aspects, and advantages will become more thoroughly apparent from the following detailed description, the set of claims, and accompanying drawings in which:

DETAILED DESCRIPTION

Figure 1:
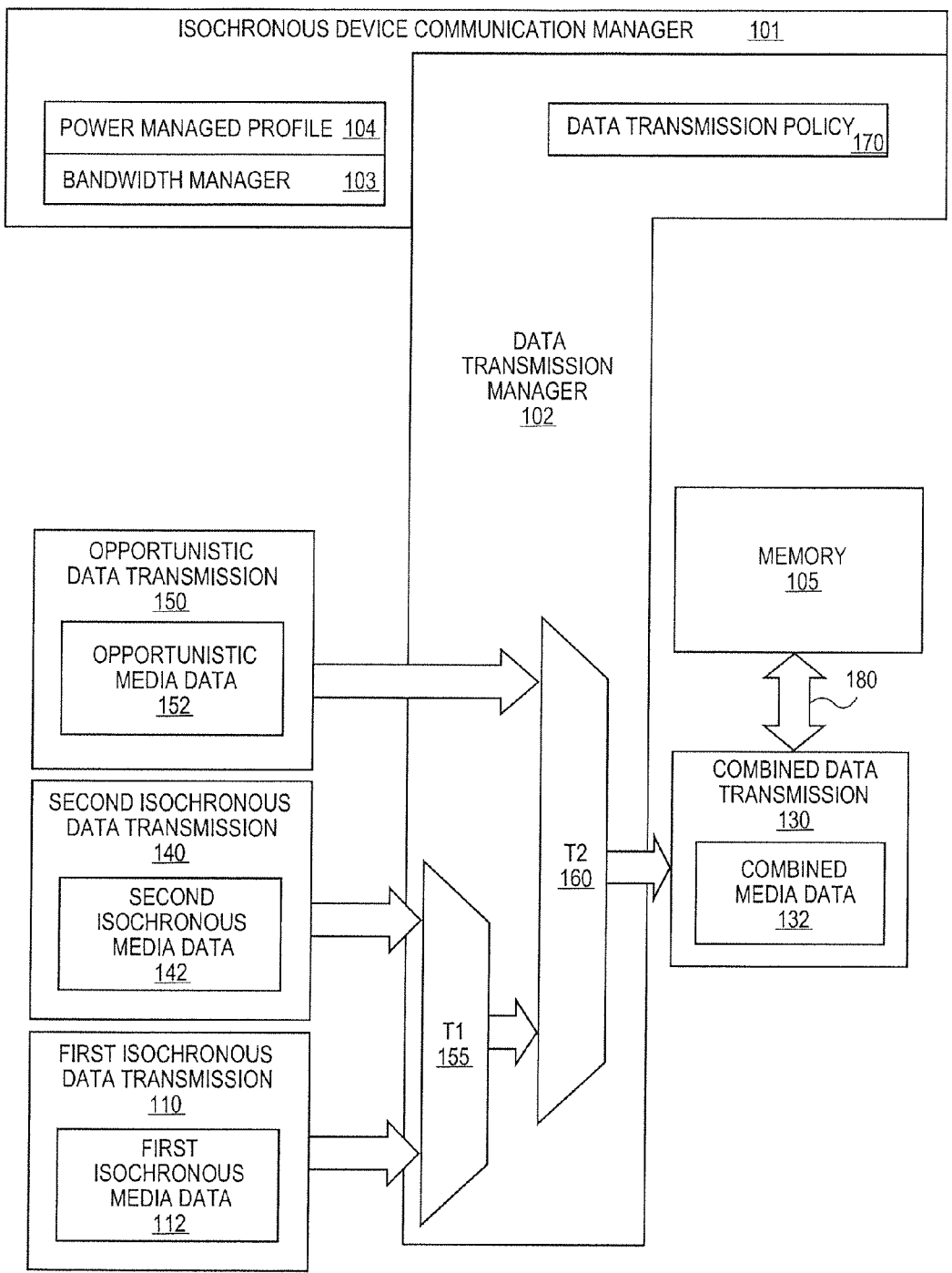
FIG. 1 is a block diagram of a isochronous device communication manager, according to one embodiment of the invention.

Various embodiments of the invention relate to apportioning a total memory bandwidth available for a time period amongst a plurality of bandwidth requests according to a power managed profile thus achieving a balance between total power available and the minimum bandwidth requirements of individual entities. Embodiments also include transmitting together one or more appended isochronous data transmissions according to a data transmission policy, wherein the data transmission policy may include transmitting the appended isochronous data during an opportunistic data transmission or during a time identified for transmitting a combined isochronous data transmission, but prior to a time delay compliance limit of an Isochronous Application/Device. For example, FIG. 1 is a block diagram of a isochronous device communication manager, according to one embodiment of the invention. As shown in FIG. 1, isochronous device communication manager 101 includes the following components: power managed profile 104, bandwidth manager 103, data transmission manager 102, and data transmission policy 170.

FIG. 1 shows transmitter 1-155 coupled to first isochronous data transmission 110 having first isochronous media data 112, and coupled to second isochronous data transmission 140 having second isochronous media data 142. Similarly, transmitter 2-160 is coupled to transmitter 1-155 as well as coupled to opportunistic data transmission 150 having opportunistic media data 152. According to embodiments media data 112, 142, 152, and/or 132 may include digital audio data and/or digital video data. Furthermore, according to embodiments, transmitter 1-155 or transmitter 2-160 may represent various software and/or hardware sufficient to select one or more data transmission packets for transmitting during a certain time period or slot, such as for transmitting during a period beginning during a desired time and extending subsequent to that desired time for a period necessary for the transmission of the one or more data transmissions or packets. Specifically, transmitter 1-155 and/or transmitter 2-160 may be capable of selecting, appending, combining, concatenating, and transmitting isochronous data packets, isochronous media data, synchronous data packets, synchronous media data, asynchronous data packets, and/or asynchronous media data into combined data transmissions and transmitting the combined data transmissions when desired (e.g., see FIG. 5 below).

Transmitter 2-160 is also shown coupled to combined data transmission 130 having combined media data 132, which is in turn coupled to data conduit 150. Data conduit 180 is shown coupled to memory 105. According to embodiments, data conduit 180 may include one or more of a data bus, chipset logic, processor logic, a processor, and other electronic hardware and/or software sufficient for providing a channel or conduit for isochronous data transmission communication (e.g., see FIG. 5 below). Moreover, according to embodiments memory 105 may be a plurality of memory modules including various types of memory, such as random access memory (RAM), double data rate RAM (DDRRAM), DDR2, synchronous dynamic RAM (SDRAM), double data rate synchronous dynamic RAM (DDRSDRAM), static RAM (SRAM), flash memory, as well as other types of synchronous and asynchronous memory as appropriate.

As shown in FIG. 1, bandwidth manager 103 may obtain a total memory bandwidth available from a memory or a time period (e.g., such as a bandwidth available for memory 105), obtain a plurality of bandwidth requests for the time period for a plurality of isochronous devices, and apportion at least a portion of the total memory bandwidth amongst the plurality of bandwidth requests according to power managed profile 104. Consequently, data transmission manager 102 may then delay transmission of the first isochronous data transmission 110 having first isochronous media data 112, and append first isochronous data transmission 110 with second isochronous data transmission 140 having second isochronous media data 142 to be transmitted to or from the same isochronous device, into combined data transmission 130 having combined media data 132. Thus, combined data transmission 130 may be read from or written to memory 105 via data conduit 180. More particularly, data transmission manager 102 may control delay of transmission of data, pending of data, and transmission of data to or from memory via transmitter 1-155 and transmitter 2-160.

Likewise, data transmission policy 170 may identify a plurality of transmission time periods during which to transmit a plurality of combined isochronous data transmissions (e.g., such as for transmitting first and second isochronous data transmissions 110 and 140 as a combined data transmission), and select a time to transmit the combined data transmission between a time for transmitting an opportunistic data transmission (e.g., such as opportunistic data transmission 150) and a time for transmitting the combined data transmission (e.g., a scheduled time for transmitting a combined data transmission having first and second isochronous data transmissions 110 and 140 combined). More particularly, opportunistic data transmission 150 may be an asynchronous data transmission, or a third isochronous data transmission (e.g., such as a third isochronous data transmission from an isochronous device other than the isochronous device that first and second isochronous data transmissions 110 and 140 are being transmitted to or from).

Note that in accordance with embodiments, any or all of the components of isochronous device communication manager 101 such as power managed profile 104, bandwidth manager 103, data transmission manager 102, data transmission policy 170, transmitter 1-155 and/or transmitter 2-160 may be embodied in hardware (e.g., such as firmware, state machines, active circuitry, hardware logic), separate software modules, and/or may be embedded within one another. For example, any of the components identified above may be a separate software or hardware module (e.g., such as a software or hardware module existing outside of manager 101 as identified in FIG. 1) and may be designed to operate together or not together with other components identified above. Specifically, for instance any of the components identified above may be separate software modules, such as part of distinct software applications, sold separate from the other components. Likewise, in embodiments, power managed profile 104 and/or data transmission policy 170 may exist outside of manager 101 shown in FIG. 1. Similarly, in embodiments, transmitter 1-155 and/or transmitter 2-260 may exist within or be a part of manager 101 shown in FIG. 1.

Figure 2:
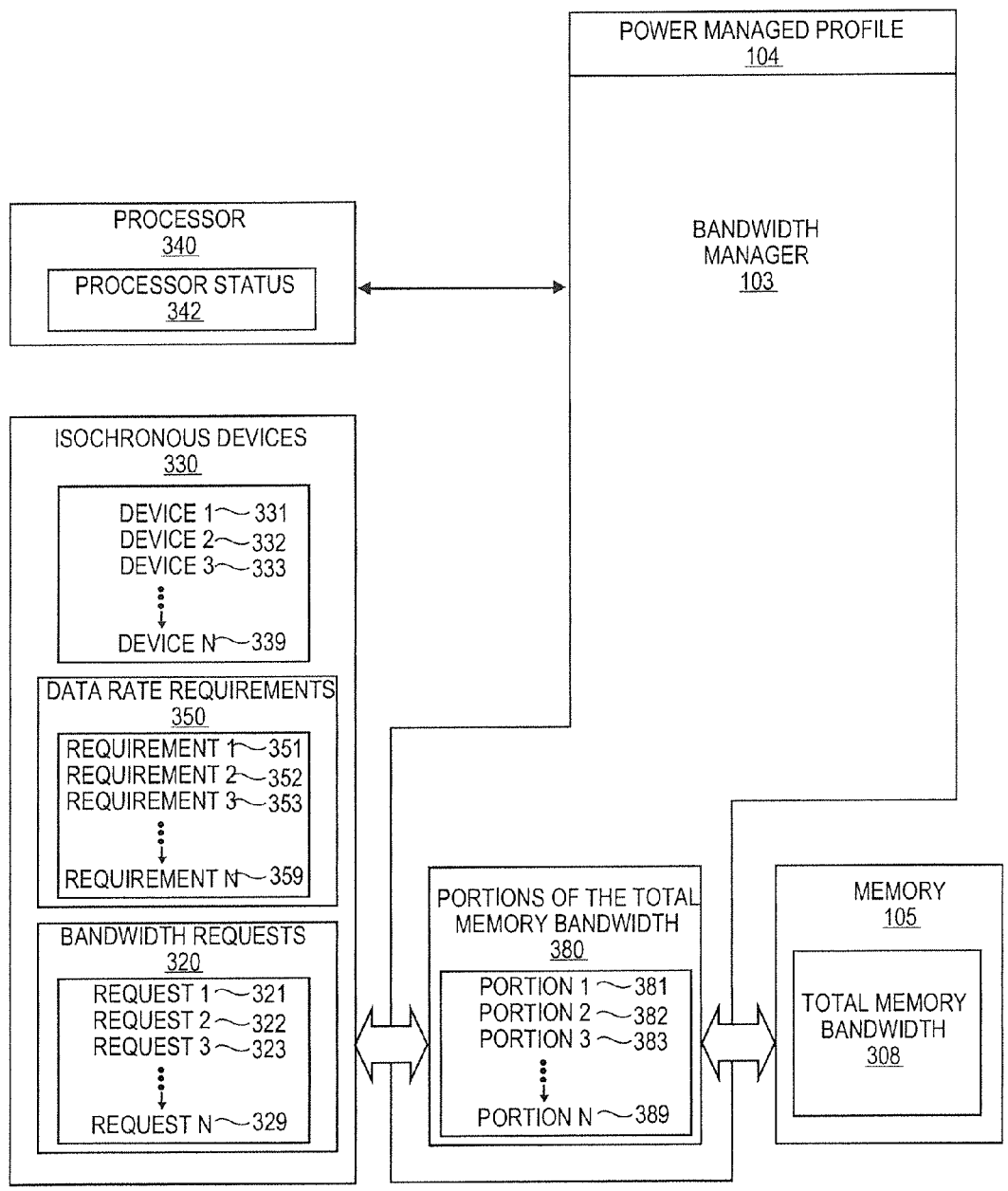
FIG. 2 is a block diagram of a bandwidth manager for apportioning a total memory bandwidth amongst a plurality of bandwidth requests.

Moreover, embodiments can be implemented as computer software in the form of computer readable code to be executed on a microprocessor. Thus, any or all of power managed profile 104, bandwidth manager 103, data transmission manager 102, data transmission policy 170, transmitter 1-155, and/or transmitter 2-160 may be included in computer software embodied in any form of computer program product. A computer program product may be a medium configured to store or transport computer readable code, or a medium in which computer readable code may be embedded. Some examples of computer program products are CD-ROM disks, ROM cards, floppy disks, magnetic tapes, computer hard drives, servers on a network, and flash memory. For instance, embodiments can be implemented as computer software in the form of computer readable code executed on a computer or processor, or in the form of bytecode class files running on such a computer or processor For example, FIG. 2 is a block diagram of a bandwidth manager for apportioning a total memory bandwidth amongst a plurality of bandwidth requests. FIG. 2 shows bandwidth manager 103 coupled to power manage profile 104, processor 340, isochronous devices 330, and memory 105. Processor 340 includes processor status 342, which may include factors like processor C-states, processor STPCLK# throttling, processor thermal T-states, and processor performance P-states. Moreover, according to embodiments, bandwidth manager 103 may also be coupled to have access to factors including device power management transition latency, and chipset memory throttling policy. Furthermore, according to embodiments, processor status 342, device power management transitional latency, and/or chipset memory throttling policy may be accessible to power managed profile 104.

Isochronous devices 330 include device 1-331, device 2-332, device 3-333, and additional devices through device N-339. Isochronous devices 330 also includes or may be associated with data rate requirements 350 having requirement 1-351, requirement 2-352, requirement 3-353 and additional requirements through requirement N-359. Likewise isochronous devices 330 includes or may be associated with bandwidth requests 320 having request 1-321, request 2-322, request 3-323 and additional requests through request N-329.

Next, memory 105 includes total memory bandwidth 308. According to embodiments, total memory bandwidth 308 may be a total memory bandwidth available in a power managed profile such as a profile for a computer running on battery power and trying to maximize the life of the battery. Thus, the total memory bandwidth may be dependent on selections and policies of a power managed profile, such as those related to power usage by a processor, RAM memory, hard drive, processor logic, memory controller, chipset logic, and data bus use. Moreover, total memory bandwidth 308 may depend on power managed profile 104. In turn, power managed profile 104 may have factors described above, be influenced by interrupt driven asynchronous activity (e.g., unless there is a necessity to perform a task that is not initiated asynchronously such as isochronous data communication) and have a goal of minimizing power consumption.

Hence, according to embodiments, bandwidth manager 103 may maintain a list of devices and their associated bandwidth. Thus, a system with a total memory bandwidth of 1400 Mb/s (Megabits per second Peak Read bandwidth) and 1100 Mb/s (Megabits per second Peak Write bandwidth) operating with Processor Front Side Bus speed/Processor Core speed/System Memory frequency speeds of 400 Mhz/3 Ghz/200 Double Data Rate may manage (e.g., have listed) the following:

1. Graphics/Video—200 Mb/s (Read) and 100 Mb/s (Write) bandwidth
2. Interrupt handling—5 Mb/s (Read) and 2 MB/s (Write) bandwidth
3. Processor non-cache execution—20 Mb/s (Read) and 10 Mb/s (Write) bandwidth
4. USB Isochronous traffic—400 Mb/s (Read) and 100 Mb/s (Write) bandwidth
5. PCI Express Isochronous Traffic—400 Mb/s (Read) and 100 Mb/s (Write) bandwidth
6. Other devices—also may have their tables defined.

According to embodiments, bandwidth manager 103 may be configured to apportion or divide at least a portion of total memory bandwidth 308 available for a time period amongst a plurality of bandwidth requests for the time period for plurality of isochronous devices 330 and according to power managed profile 104. Thus, bandwidth manager 103 may divide or apportion total memory bandwidth 308 into portions of the total memory bandwidth 380, having portion 1-381, portion 2-382, portion 3-383, and additional portions through portion N-389. Bandwidth manager 103 may then apportion or assign one or more of the portions of the total memory bandwidth amongst plurality of bandwidth requests 320 for isochronous devices 330, such as according to power managed profile 104, and/or according to plurality of data rate requirements 350 associated with plurality of isochronous devices 330. Note that although data rate requirements 350 and bandwidth request 320 are shown as part of isochronous devices 330 in FIG. 2, it can be appreciated that the data rate requirements and bandwidth requests need not be located within or generated at isochronous devices 330 (e.g., the requirements and requests may be provided by one or more isochronous applications external to, but related to isochronous devices 330, shown in FIG. 2).

Therefore, according to embodiments, bandwidth manager 103 may obtain total memory bandwidth 308 and plurality of bandwidth requests 320 for a period of time (e.g., such as for a fraction of a second, for one second, or for more than one second). Then, bandwidth manager 103 may apportion portions of a total memory bandwidth available for a period of time such as one second amongst bandwidth request 320 for the same period of time (e.g., for the same one second period) according to power managed profile 104, processor status 342, and/or data rate requirements 350. Therefore, for example, bandwidth manager 103 may divide total memory bandwidth 308 into one or more of portion 1-381 through portion N-389, and satisfy at least two of request 1-321 through request N-329, each with at least one of portion 1-381 through portion N-389. Moreover, according to embodiments bandwidth request 320 and/or data rate requirement 350 may be bandwidth requests and/or data rate requirements for isochronous devices 330 (e.g., request 1-321 through request N-329, and requirement 1-351 through requirement N-359, may correspond to device 1-331 through device N-339).

Figure 3:
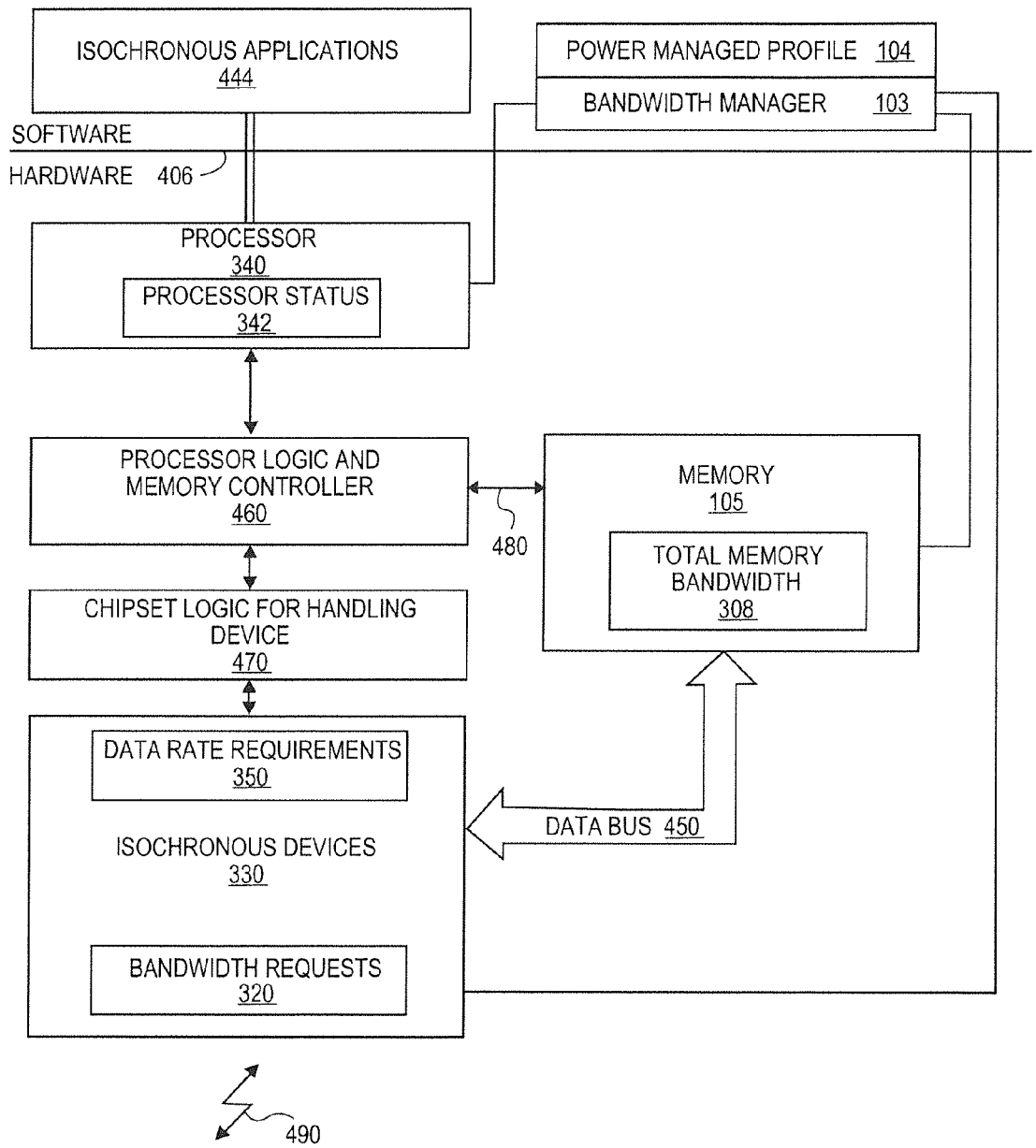
FIG. 3 is a block diagram of a system for transmitting isochronous data between isochronous devices and a memory, in accordance with one embodiment of the invention.

Bandwidth manager 103 may also be coupled to isochronous devices 330 to manage data communication between isochronous devices 330 and memory 105, such as via a data communication conduit (e.g., such as data conduit 180 shown in FIG. 1 which may be a data bus coupled between memory 105 and isochronous devices 330). For example, FIG. 3 is a block diagram of a system for transmitting isochronous data between isochronous devices and a memory, in accordance with one embodiment of the invention. FIG. 3 shows isochronous applications 444 on the software side of software hardware demarcation line 406. Isochronous applications may be one or more software applications including computer software as described above, running on a computer such as a personal computer, a network computer, a client computer, a server computer, a laptop computer, a palm or handheld computing device, a cellular telephone, a mobile telephone, an electronic planner, a processor, or other appropriate computing device. Additionally, isochronous applications 444 may include one or more software applications for communicating or transmitting isochronous data between one or more isochronous devices and a data consumer, target, generator, or provider such as memory 105.

Isochronous applications 444 are shown coupled to or associated with processor 340 having processor status 342 across software hardware demarcation line 406. Processor 340 is coupled to processor logic and memory controller 460, which is in turn coupled to memory 105 and chipset logic for handling device 470. Chipset logic for handling device 470 is coupled to isochronous devices 330 having data rate requirements 350 and bandwidth requests 320. Data bus 450 (e.g., such as a data conduit according to data conduit 180 described above with respect to FIG. 1) couples isochronous devices 330 to memory 105.

Bandwidth manager 103 is coupled to power managed profile 104, processor 340, memory 105, and isochronous devices 330. Isochronous devices 330 include isochronous device media sensors and transducers 490, such as video and audio media inputs and outputs such as video displays, video cameras, audio microphones, audio speakers, and/or other data repositories or sources such as memory modules other than memory 105.

Thus, in embodiments, total memory bandwidth 308 available for a time period may be a memory bandwidth available for a period of time selected or determined depending on processor status 342 and/or power managed profile 104 as described above with respect to FIGS. 1 and 2. Moreover, data rate requirements 350 may be associated with a plurality of time delay compliance limits for isochronous devices 330, where isochronous devices 330 are related to isochronous applications 444 run by processor 340. More specifically, data rate requirements 350 may be associated with time delay compliance limits related to a computing device user's perception of media data being communicated by the isochronous devices. For example, a computing device user's perception may be related to a time period or frequency for video and/or audio data being rendered for to the user, or a group of users (e.g., such as by averaging the limits for the group) where the limit corresponds to a point at which the user or users are able to perceive an effect on the media played or rendered. More specifically, a user perception limit may be selected or determined according to the video frame rate or audio playback rate at which one or more users can perceive a degradation, or effect on the data being displayed or played. Thus, video, and/or audio can be displayed or played at data rates where errors are not perceived by the user. However, for video or audio played at data rates below the user perception limit the user or users would perceive visible or audible artifacts resulting from discontinuities in the video or audio data being displayed or played. Such a discontinuity may be the result, for example, of a video or audio input or output device transmitting or receiving isochronous data at a frequency below the data rate requirements associated with the user perception limit.

Furthermore, according to embodiments, data bus 450 may transmit combined isochronous data transmissions such as combined data transmission 130, to and from memory 105, such as in accordance with data transmission policy, (e.g., such as data transmission policy 170, determined based on power managed profile 104, and plurality of bandwidth request 320). Moreover, bandwidth request 320 may be associated with data rate requirements 350, such as to provide bandwidth requests for isochronous devices 330 in order to provide isochronous data transmissions at a frequency sufficient to meet or exceed data rate requirements 350. In addition, according to embodiments, isochronous data transmitted between isochronous devices 330 and memory 105 may be transmitted via processor logic and memory controller to memory coupling 480, and/or via data bus 450. Thus, combined data transmission, such as combined data transmission 130, may be read from or written to memory 105 as controlled by a processor, such as processor 340 via a conduit including chipset device 470, processor logic in memory controller 460 and coupling 480, or via a conduit including data bus 450. Likewise, according to embodiments, combined data transmission 130 may include asynchronous data as well as isochronous data.

Figure 4:
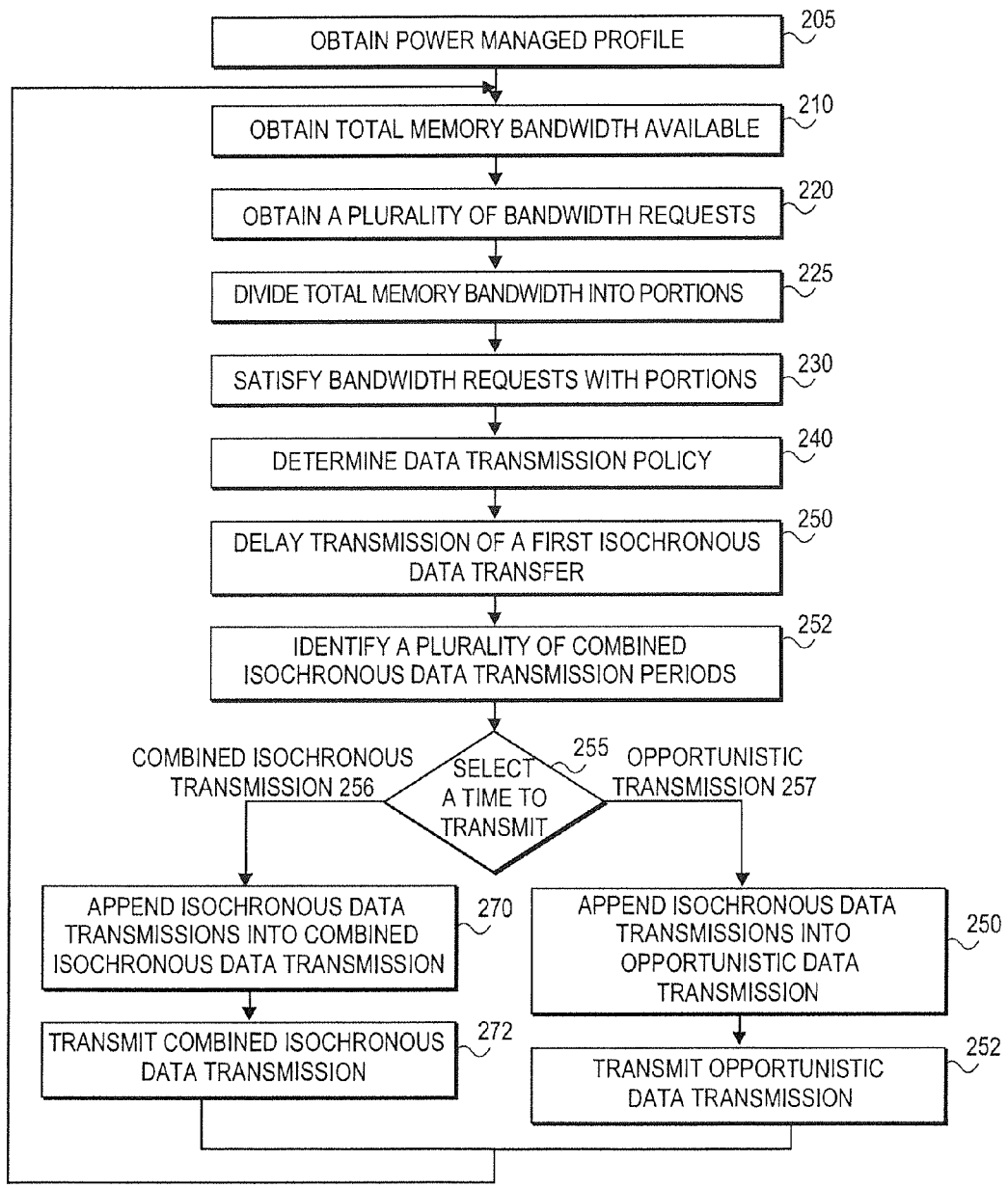
FIG. 4 is a flow diagram of a process for transmitting at least one isochronous data transmission with another isochronous data transmission, or during an opportunistic data transmission.

For instance, FIG. 4 is a flow diagram of a process for transmitting at least one isochronous data transmission with another isochronous data transmission, or during an opportunistic data transmission. At block 205 a power managed profile is obtained, such as by power managed profile 104 being accessible to bandwidth manager 103. Note that herein obtaining may be described by a process including determining, identifying, selecting, receiving, or already having data information and/or a component as described above with respect to FIG. 1. At block 210 a total memory bandwidth available is obtained, such as by total memory bandwidth 308 for a time period, being available to bandwidth manager 103. According to embodiments, total memory bandwidth available may be obtained by polling memory 105. At block 220 a plurality of bandwidth requests are obtained, such as by bandwidth requests 320 for a time period, being available to bandwidth manager 103. Similarly, in embodiments, plurality of bandwidth requests may be obtained by polling, such as by polling isochronous devices 330 and/or polling isochronous applications 444 associated with isochronous devices 330. At block 225 through block 230, at least a portion of the total memory bandwidth is apportioned amongst a plurality of bandwidth requests, such as by bandwidth manager 103 apportioning some of portions of the total memory bandwidth 380 amongst one or more of bandwidth request 320 according to power managed profile 104 and plurality of data rate requirements 350 associated with isochronous devices 330.

More particularly, at block 225 total memory bandwidth is divided into portions, such as by bandwidth manager 103 dividing total memory bandwidth 308 into one or more of portion 1-381 through portion N-389. At 230 bandwidth requests are satisfied with portions of the total memory bandwidth, such as by bandwidth manager 103 satisfying one or more of request 1-321 through N-329, each with one or more of portion 1-381 through portion N-389. At block 240 a data transmission policy is determined, such as by determining data transmission policy 170 based on power managed profile 104 and bandwidth request 320. For example, the data transmission policy may manage transmitting at least one isochronous data transmission during a transmission time of one of an asynchronous data transmission and another isochronous data transmission; or to manage delaying transmission of a first isochronous data transmission and combining a first isochronous data transmission with a second isochronous data transmission from the same isochronous device or application.

At block 250 transmission of a first isochronous data transfer is delayed, such as by data transmission manager 102 delaying transmission of first isochronous data transmission 110, having first isochronous media data 112 to be transmitted to or from a first isochronous device such as device 1-331 and memory 105. According to one embodiment, first isochronous data transmission 110 is delayed to be appended to one or more other isochronous data transmissions from the same isochronous device or application. Thus, first isochronous data transmission 110 as well as second isochronous data transmission 140 may be delayed such as to be combined with a third isochronous data transmission from the same isochronous device or application, or to be transmitted during an opportunistic data transmission which may be an isochronous data transmission for another isochronous device or application or which may be an asynchronous data transmission. Also, according to embodiments, first isochronous data transmission 110 need not be delayed. For instance, first isochronous data transmission 110 may be transmitted during an opportunistic data transmission as described above, prior to a time that would require that first isochronous data transmission 110 be delayed.

At block 252, a plurality of combined isochronous data transmission periods may be identified, such as by data transmission manager 102 or data transmission policy 170 identifying a set of time periods or frequency at which to transmit a plurality of combined isochronous data transmissions having media data from at least two isochronous data transmissions. For example, according to embodiments, data transmission policy 170 reduces a first frequency of transmission times related to transmitting first isochronous data transmission 110 to a less frequent second frequency of transmission times related to transmitting combined data transmission 130. Specifically, in embodiments, the less frequent second frequency may transmit combined data transmissions prior to expiration of a time delay compliance limit and may or may not require delay of one or more isochronous data transmissions between an isochronous device or application and a memory. For example, a frequency or plurality of transmission time periods may be identified to transmit a plurality of combined data transmissions 130 each having at least first isochronous media data 112 and second isochronous media data 142. Moreover, in embodiments, combined media data 132 may include first and second isochronous media data 112 and 142. Also, in embodiments, combined data transmission 130 may include opportunistic media data 152 as well as isochronous media data (e.g., such as by including opportunistic media data in combined media data 132).

At block 255 a time to transmit the combined data transmission is selected, such as by data transmission manager 102 or data transmission policy 170 selecting, determining, or obtaining, a time to transmit combined data transmission 130. For instance, a time to transmit may be selected from a transmission time of an opportunistic data transmission and a transmission time of one of the plurality of combined isochronous data transmissions, such as those described above for block 252. If combined isochronous transmission path 256 is selected, the process continues to block 270 where the first isochronous data transmission is appended with the second isochronous data transmission into a combined isochronous data transmission, such as by data transmission manager 102 appending first isochronous data transmission 110 having media data 112 and second isochronous data transmission 140 having media data 142 to form combined data transmission 130 having combined media data 132 according to data transmission policy 170. At block 272 the combined isochronous data transmission is transmitted, such as by being transmitted to or from a first isochronous device or application and memory 105 via conduit 180 or coupling 480, as described above.

Further, according to embodiments, the combined isochronous data transmission may be delayed such as to be transmitted during an opportunistic transmission, combined with a third isochronous data transmission from the same isochronous device or application, or to be transmitted prior to expiration of a time delay compliance limit. Moreover, according to embodiments, the combined isochronous data transmission, or a single isochronous data transmission, may be transmitted earlier than previously scheduled, such as by transmitting the combined or single isochronous data transmission prior to the next identified combined isochronous data transmission time, or prior to expiration of a time delay compliance limit. Such a transmission of a combined or single isochronous data transmission may or may not be combined with another data transmission, and/or may or may not be transmitted during an opportunistic transmission or during a combined isochronous data transmission, as described herein. More specifically, for instance, second isochronous data transmission 140 may be transmitted prior to a time when it would normally be scheduled to be transmitted, such as by transmitting second isochronous data transmission alone, or combined with another data transmission (1) during an opportunistic data transmission (e.g., such as by combining second isochronous data transmission 140 with opportunistic data transmission 150 and transmitting those transmissions prior to the current schedule for transmitting second isochronous data transmission 140), or (2) during a combined isochronous data transmission, (e.g., such as combining by combining second isochronous data transmission 140 with first isochronous data transmission 110 and transmitting those transmissions during a combined isochronous data transmission, prior to the current scheduled transmission time for second isochronous data transmission 140).

On the other hand, if at block 255, opportunistic transmission path 257 is selected, the process proceeds to block 260 where isochronous data transmission may be appended into an opportunistic data transmission, such as by data transmission manager 102 appending one or more of first isochronous data transmission 110, second isochronous data transmission 140, and opportunistic data transmission 150 to form combined data transmission 130 for transmission during an opportunistic asynchronous data transmission (e.g., which may or may not be opportunistic data transmission 150) or a third isochronous data transmission (e.g., which is not an isochronous data transmission for the device or application which the appended data transmissions are being transmitted to or from). At block 262, the opportunistic data transmission is transmitted, such as by being transmitted to or from an isochronous device or application and memory 105 as described above with respect to block 272. Also, according to embodiments, an opportunistic data transmission may include one isochronous data transmission that is or is not delayed, may include a second isochronous data transmission that is or is not delayed, and may be transmitted prior to expiration of a time delay compliance limit as described above.

After block 272 or block 262 the process continues to "A". Note that blocks 210 through 272 may be described as reoccurring or cyclic processes while block 205 may be described as a standing or persistent condition. Moreover, according to embodiments, block 252 may be performed any time after block 240. Also, according to embodiments, blocks 262 and 272 may refer to reading media data of the combined data transmission from a memory or writing media data of the combined data transmission to a memory.

Figure 5:
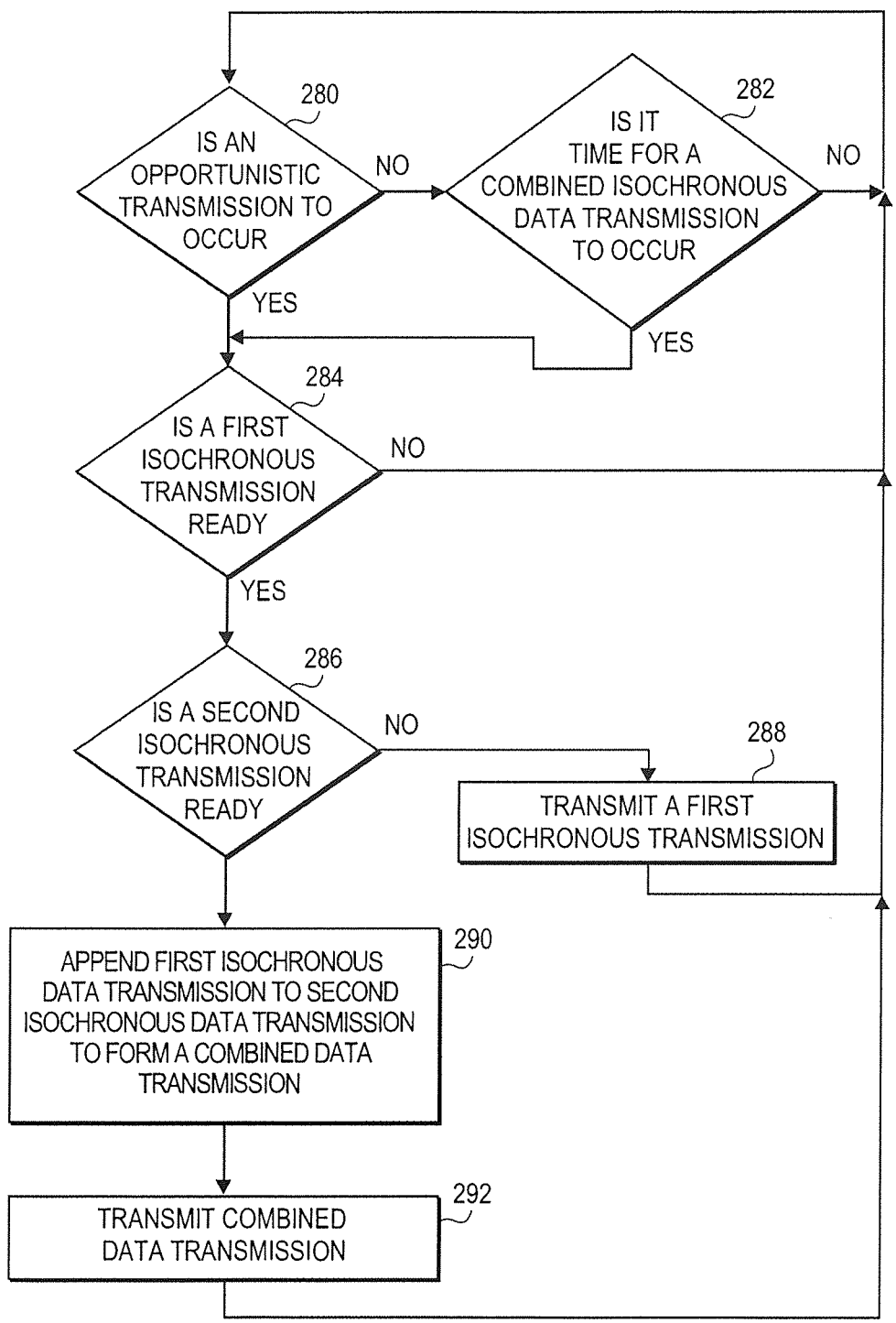
FIG. 5 is a flow diagram for appending isochronous data transmissions into a combined data transmission, in accordance with one embodiment of the invention.

FIG. 5 is a flow diagram for appending isochronous data transmissions into a combined data transmission, in accordance with one embodiment of the invention. FIG. 5 shows a process which may or may not represent blocks 255 through 272 of FIG. 4 in embodiments to select a time to combine isochronous data transmissions into a combined isochronous data transmission or an opportunistic data transmission and to transmit the combined or opportunistic transmission. For example, at decision block 280 it is determined whether an opportunistic transmission is to occur, such as by data transmission manager 102 determining whether opportunistic data transmission 150 is going to occur and when. If at block 280 an opportunistic transmission is not going to occur, the process continues to decision block 282 where it is determined if it is time for a combined isochronous data transmission to occur. Moreover, an opportunistic transmission may be scheduled to occur before the next combined isochronous data transmission is to occur, and thus may provide an opportunity for sending one or more appended isochronous data transmissions as a combined data transmission to be transmitted prior to expiration of a time delay compliance limit, with or without requiring delay of one or more isochronous data transmissions.

If at block 282 it is not time for a combined isochronous data transmission, the process returns to block 280. If at block 280 it is time for an opportunistic transmission to occur, or if at block 282 it is time for a combined isochronous data transmission to occur, the process continues to decision block 284 where it is determined whether a burst isochronous transmission is ready, such as by data transmission manager 102 determining whether burst isochronous data transmission 110 has or will have sufficient media data at first isochronous media data 112 to be transmitted. If at block 284 a first isochronous transmission is not ready, the process returns to block 280. If a first isochronous transmission is ready at block 284, the process continues to decision block 286 where it is determined whether a second isochronous transmission is ready to be transmitted, such as by data transmission manager 102 determining whether second isochronous data transmission 140 has or will have sufficient media data at second isochronous media data 142 to be transmitted. If at block 286 a second isochronous transmission is not ready, the process continues to block 288 where the first isochronous transmission is transmitted, such as by data transmission manager 102 transmitting first isochronous data transmission 110 between an isochronous device and memory 105 (e.g., such as by transmitting first isochronous data transmission 110 as combined data transmission 130). If a second isochronous transmission is ready at block 286 the process continues to block 290 where the first isochronous data transmission is appended to the second isochronous data transmission into a combined data transmission, such as by data transmission manager 102 combining first and second isochronous data transmissions 110 and 140 to form combined data transmission 130. Note that according to embodiments, if a second isochronous transmission is ready at block 286 the process may return to block 286 to determine whether a third or subsequent isochronous transmission is ready, until no more isochronous transmissions are ready to be transmitted prior to or at the time of the opportunistic transmission or combined isochronous data transmission to occur, for the isochronous device or application. In this manner, more than two isochronous transmissions may be appended together and transmitted during the next transmission time.

At block 292 the combined data transmission is transmitted. After block 292 the process returns to block 280. Note that in embodiments, the combined data transmission may include isochronous data that is to be transmitted during the next combined data transmission, such as when an opportunistic transmission occurs. Therefore, in certain instances, it will not be necessary to transmit some or all of the data usually transmitted during the subsequent combined isochronous data transmission time.

Incidentally, since isochronous data transmissions are being combined and transmitted during combined isochronous data transmission times which are less frequent than the time for transmitting single isochronous data transmission, power is being saved at block 292 and in FIGS. 1 and 3-5. Specifically, power is saved since it is not necessary to power a computing device processor, memory, bus, memory controller, chipset logic, transmitters, or other components as frequently to transmit the combined isochronous data transmissions as compared to to transmit each single isochronous data transmission. Similarly, since during an opportunistic transmission time any isochronous data transmission, combined or not, does not require any substantial additional powering of the components identified above and beyond that required for the opportunistic transmission, power is saved at block 292 and in FIGS. 1 and 3-5.

Figure 6:
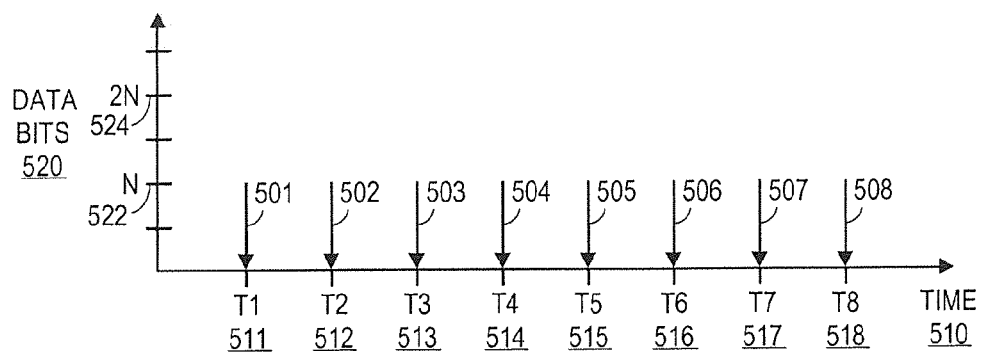
FIG. 6 is a timing diagram of isochronous data transmissions.

For example, FIG. 6 shows a timing diagram of isochronous data transmission. FIG. 6 is a graph of data bits 520 versus time 510 showing isochronous data transmissions 501 through 508 having end data bits 522 transmitted at times T-511 through T8-518. Thus, according to embodiments, isochronous data transmissions 501 through 508 may each include media data, such as if isochronous data transmission 501 is first isochronous data transmission 110 having first isochronous media data 112 of video data from a video camera, and isochronous data transmission 502 is second isochronous data transmission 140 having second isochronous media data 142 of audio data from the same video camera.

Figure 7:
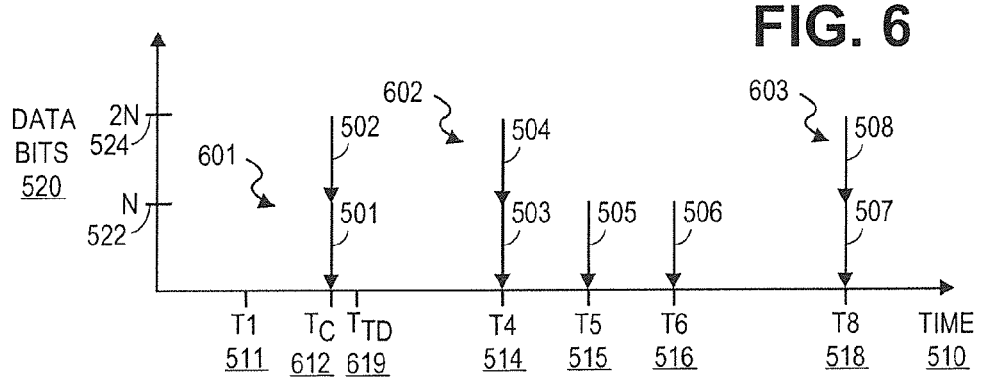
FIG. 7 is a timing diagram of combined isochronous data transmissions, in accordance with one embodiment of the invention

Next, FIG. 7 shows a timing diagram of combined isochronous data transmissions, in accordance with one embodiment of the invention. FIG. 7 is a graph of data bits 520 versus time 510 showing combined data transmissions 601 through 603 transmitted during combined isochronous data transmission times as described above with respect to block 282. For instance, combined isochronous data transmission 601 may be combined data transmission 130 having first isochronous data transmission 110 appended to second isochronous data transmission 140 and transmitted at combined isochronous data transmission time $T_C$-612 prior to expiration of time delay compliance limit time $T_{TD}$-619. Also, as shown in FIG. 7, combined isochronous data transmission 601 includes isochronous data transmissions 501 and 502, and has 2N data bits 524 of data. Moreover, according to embodiments, combined isochronous data transmission 601 may represent a "clubbing", concatenation, appending, combining of data at end points, and/or burst of combined isochronous data transmissions. For example, combined isochronous data transmission 601 may include isochronous data transmission 501 having a first frame, sequence number, header, data field (e.g., between 0 and 4 kilobytes in size), Link Cyclic Redundancy Check (LCRC), and frame to which is appended isochronous data transmission 502 having a second frame, sequence number, header, data field, LCRC, and frame to form a combined data transmission. Specifically, in the combined data transmission, both isochronous data transmissions 501 and 502 keep their associated header in order to guarantee the quality of service (QOS) for each of them. Thus, in the example above, the isochronous data transmissions present the data in a serialized manner instead of modifying the data.

Also note that the transmission time of the combined isochronous data occurs prior to the expiration of time delay compliance time limit $T_{TD}$. Thus, the isochronous device and/or isochronous application, consuming, displaying, playing, or using the data, such as to project the data to a device user, will be able to project the data without degradation to or effecting the user's perception of the data, as described above. For instance, as long as isochronous data transmission 502 is ready, combined isochronous data transmission 601 may be transmitted at any time between T1-511 (e.g., when isochronous data transmission 501 is ready for transmission) and $T_{TD}$-619 (e.g., the expiration of the time delay compliant limit). Thus, the time between T1-511 and $T_{TD}$-619 defines a time slot or period during which all isochronous data available at any time during that time slot may be transmitted as a combined data transmission for a specific isochronous device or application. More particularly, isochronous data transmission 501 may be combined with a second isochronous data transmission from the same device or application and transmitted (1) at a time that a third isochronous data transmission from the same device or application is ready for transmission, (2) at a time that an isochronous device from a different device or application is ready from transmission, or (3) at a time when a non-isochronous data transmission is ready for transmission, prior to time delay compliance limit time $T_{TD}$-619.

Figure 8:
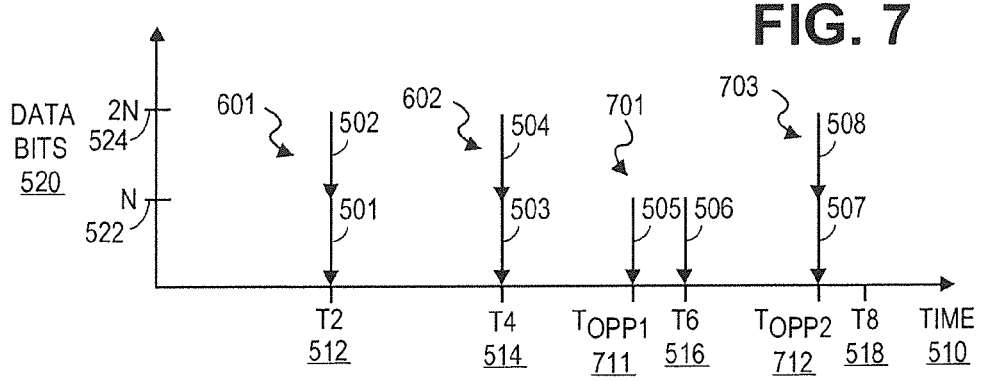
FIG. 8 is a timing diagram of combined isochronous data transmissions showing opportunistic isochronous data transmissions, in accordance with one embodiment of the invention.

For instance, FIG. 8 is a timing diagram of combined isochronous data transmissions showing opportunistic isochronous data transmissions, in accordance with one embodiment of the invention. FIG. 8 is a graph of data bits 520 versus time 510 showing isochronous data transmission 505 transmitted as opportunistic data transmission 701 at opportunistic transmission time $T_{OPP}$1-711. FIG. 8 also shows opportunistic data transmission 702 having isochronous data transmissions 507 and 508 transmitted during second opportunistic data transmission time $T_{OPP}$2-712. According to embodiments, opportunistic data transmission 701 corresponds to a situation where a first isochronous data transmission is ready for transmission during opportunistic transmission time $T_{OPP}$1, but a second isochronous transmission is not yet ready (e.g., isochronous data transmission 505 is ready, yet isochronous data transmission 506 is not). On the other hand, according to embodiments, opportunistic data transmission 702 corresponds to a situation where two isochronous transmissions are ready to be transmitted at the opportunistic transmission time (e.g., isochronous data transmissions 507 and 508 are both ready at $T_{OPP}$2).

Figure 9:
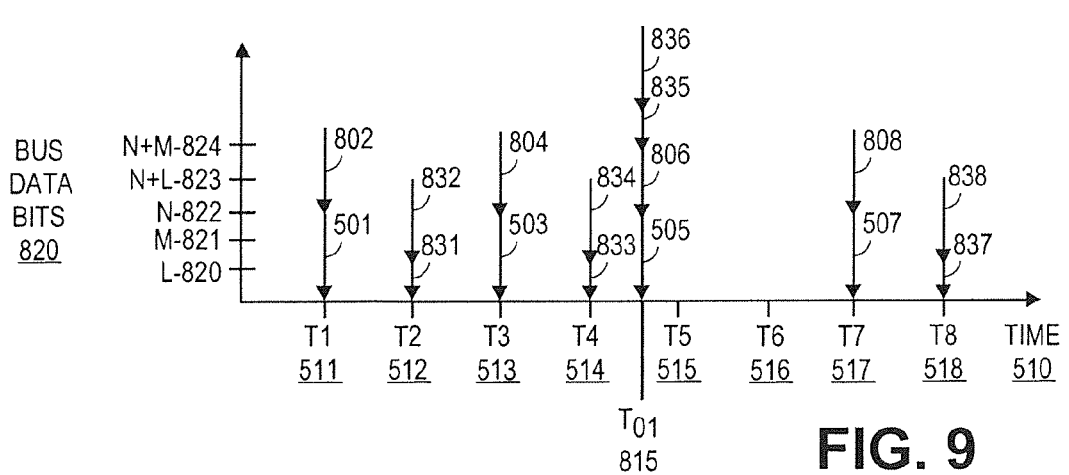
FIG. 9 is a timing diagram of combined isochronous data transmissions and opportunistic data transmissions for two isochronous devices, in accordance with an embodiment of the invention.

Finally, FIG. 9 is a timing diagram of combined isochronous data transmissions and opportunistic data transmissions for two isochronous devices, in accordance with an embodiment of the invention. FIG. 9 is a graph of bus data bits 820 versus time 510 showing combined isochronous data transmissions for more than one isochronous device or application, and having variously sized data bit transmissions. For example, at time T1-511, a combined data transmission including isochronous data transmission 501 having N data bits 822 from a video camera, appended with isochronous data transmission 802 having M data bits from the same video camera, is transmitted to a memory. Then, at time T2-512, a combined isochronous data transmission having isochronous data transmission 831 having L data bits 820 from a microphone, appended with isochronous data transmission 832 having N data bits from the same microphone, is transmitted to the memory. Note that at opportunistic transmission time $T_{O1}$, that combined isochronous data transmission for the video camera having isochronous data transmissions 505 and 806 is appended with combined isochronous data transmission for the microphone having isochronous data transmissions 835 and 836 (e.g., isochronous data transmissions 505, 806, 835, and 836 were all ready for transmission at time $T_{O1}$-815). Subsequently, since all of the isochronous data transmissions prior to time T7-517 are transmitted at time $T_{O1}$, it is not necessary for further isochronous data to be transmitted prior to T7 for the video camera or microphone.

As can be seen from FIGS. 7-9, the number of times data must be transmitted and power consumed in order to transmit that data is reduced as compared to FIG. 6, since the components necessary to transmit the data need to be powered up less frequently than the eight times they need to be powered up in FIG. 6 (e.g., the length of time the components are required to be powered up in order to transmit the combined data transmissions requires less power than is required to power up those components multiple times for required durations in order to provide separate transmission of the isochronous data during the eight separate transmissions).

In the foregoing specification, the invention has been described with reference to specific embodiments thereof. However, it will be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method in a computer system comprising:
   apportioning at least a portion of a total memory bandwidth available for a time period amongst a plurality of digital video data or digital audio data bandwidth requests for the time period for a plurality of isochronous devices, according to a power managed profile, wherein apportioning includes dividing the total memory bandwidth into a plurality of portions of the total memory bandwidth;
   determining when to combine data of at least two isochronous data packet transmissions of digital video data or digital audio data into a combined data packet transmission, based on the power managed profile;
   satisfying at least two of the plurality of bandwidth requests each with at least one of the plurality of portions of the total memory bandwidth by appending endpoints of the data of the at least two isochronous data packet transmissions to form the combined data packet transmission.

2. The method of claim 1, wherein apportioning comprises apportioning the at least a portion of the total memory bandwidth available according to a plurality of data rate requirements associated with the plurality of isochronous devices, wherein the power managed profile causes the total bandwidth to be apportioned amongst the plurality of bandwidth requests based at least on interrupt driven asynchronous activity and isochronous data communication.

3. The method of claim 1, wherein the combined data packet transmission is a single databurst transmission during a single time of data of the at least two isochronous data packets appended at endpoints of the data, wherein obtaining a plurality of bandwidth requests includes polling a plurality of isochronous applications corresponding to the plurality of isochronous devices.

4. The method of claim 1, further comprising:
   storing the combined data packet in a memory;
   determining a data transmission policy based on the power managed profile and the plurality of bandwidth requests, the data transmission policy to manage delaying transmission of a first isochronous data transmission and to manage combining data of the first isochronous data packet transmission with data of a second data packet transmission into a combined data packet transmission, and to manage determining when to transmit the combined data packet transmission;
   after storing, powering-up components required to transmit the combined data packet; then
   transmitting the stored combined data packet; and
   saving power by delaying transmission of the first isochronous data transmission and reducing the number of isochronous data transmissions to satisfy the data transmission policy.

5. The method of claim 1 further comprising:
   delaying transmission of a third and of a fourth isochronous data packet transmission, and
   combining data of the third and fourth isochronous data packet transmissions with data of an asynchronous data packet transmission into the combined data packet for transmission.

6. The method of claim 1, wherein the power managed profile comprises power usage policies for a processor, RAM memory, hard drive, processor logic, memory controller, chipset logic and data bus use, and wherein the power managed profile apportions the bandwidth based on a balance between a total power available and a minimum bandwidth requirement of individual entities submitting the requests and including the isochronous devices, and wherein apportioning includes dividing the total memory bandwidth into at least four portions of the total memory bandwidth to balance between total power available according to the power managed profile and a plurality of minimum bandwidth requirements of individual entities generating the plurality of bandwidth requests.

7. A method in a computer system comprising:
   appending endpoints of data of a first isochronous data packet transmission having media data of digital video data or digital audio data to be transmitted to or from a first isochronous device with a second isochronous data packet transmission having media data of digital video data or digital audio data to be transmitted to or from the first isochronous device into a combined data packet transmission, wherein the combined data packet transmission is a single databurst transmission during a single time, wherein appending is performed according to a data transmission policy, wherein the data transmission policy reduces a first frequency of transmission times related to transmitting the first isochronous data packet transmission to a less frequent second frequency of transmission times related to transmitting the combined data packet transmission;
   using the transmission policy to identify a transmission time period during which to transmit the combined isochronous data packet transmission.

8. The method of claim 7, further comprising:
   determining when to delay transmission of the first isochronous data transmission based on the data transmission policy;

delaying transmission of the first isochronous data transmission.

9. The method of claim 7, further comprising:
using the transmission policy to identify a plurality of transmission time periods during which to transmit a plurality of combined isochronous data packet transmissions, each combined isochronous data packet transmission having media data from at least two isochronous data packet transmissions.

10. The method of claim 7 further comprising:
using the transmission policy to select a time to transmit the combined data packet transmission, wherein selecting includes selecting between a transmission time of an opportunistic data transmission and a transmission time of a combined isochronous data packet transmission; and
one of reading media data packet of the combined data packet transmission from a memory and writing media data of the combined data packet transmission to a memory.

11. The method of claim 7, further comprising:
determining when to append the first isochronous data packet transmission with the second isochronous data packet transmission into a combined data packet transmission, based on the data transmission policy.

12. The method of claim 7, further comprising:
delaying transmission of the second isochronous data packet transmission, and wherein appending further comprises:
appending an asynchronous data packet transmission with the first and second isochronous data packet transmissions to form the combined data packet transmission into the combined data packet for transmission.

13. The method of claim 7 further comprising:
the data transmission policy to manage delaying transmission of a third and of a fourth isochronous data packet transmission, and to manage combining data of the third and fourth isochronous data packet transmissions with data of an asynchronous data packet transmission into the combined data packet for transmission.

14. A device comprising:
a bandwidth manager of a computer system configured to:
apportion at least a portion of a total memory bandwidth available for a time period amongst a plurality of digital video data or digital audio data bandwidth requests for the time period for a plurality of isochronous devices, according to a power managed profile, wherein apportioning includes dividing the total memory bandwidth into a plurality of portions of the total memory bandwidth;
determine when to combine data of at least two isochronous data packet transmissions of digital video data or digital audio data into a combined data packet transmission, based on the power managed profile; and
satisfy at least two of the plurality of bandwidth requests each with at least one of the plurality of portions of the total memory bandwidth by appending endpoints of the data of the at least two isochronous data packet transmissions to form the combined data packet transmission.

15. The device of claim 14, wherein the combined data packet transmission is a single databurst transmission during a single time of data of the at least two isochronous data packets appended at endpoints of the data, wherein the plurality of isochronous devices are related to the plurality of isochronous applications run by a processor, and wherein the data rate requirements are associated with a plurality of time delay compliance limits for the plurality of isochronous devices.

16. The device of claim 14, wherein the combined data packet transmission is a single databurst transmission during a single time of data of the at least two isochronous data packets appended at endpoints of the data, wherein the plurality of isochronous devices are related to the plurality of isochronous applications run by a processor, and wherein the data rate requirements are associated with a plurality of time delay compliance limits for the plurality of isochronous devices.

17. The device of claim 14, wherein the bandwidth manager is coupled to the plurality of isochronous devices to manage data communication between the plurality of isochronous devices and a memory, and wherein a duration of the time period depends on a status of a processor.

18. The device of claim 14, wherein the bandwidth manager is coupled to the plurality of isochronous devices to manage data communication between the plurality of isochronous devices and a memory, and wherein a duration of the time period depends on a status of a processor.

19. An article of manufacture of a computer system comprising:
a non-transitory machine-readable medium having data therein which when accessed by a processor causes a bandwidth manager to:
apportion at least a portion of a total memory bandwidth available for a time period amongst a plurality of digital video data or digital audio data bandwidth requests for the time period for a plurality of isochronous devices, according to a power managed profile, wherein apportioning includes dividing the total memory bandwidth into a plurality of portions of the total memory bandwidth;
determine when to combine data of at least two isochronous data packet transmissions of digital video data or digital audio data into a combined data packet transmission, based on the power managed profile; and
satisfy at least two of the plurality of bandwidth requests each with at least one of the plurality of portions of the total memory bandwidth by appending endpoints of the data of the at least two isochronous data packet transmissions to form the combined data packet transmission.

20. The article of manufacture of claim 19, further comprising:
data to cause the bandwidth manager to determine the data transmission policy based on the power managed profile and the plurality of bandwidth requests, the data transmission policy to delay transmission of a first isochronous data transmission and to combine data of the first isochronous data transmission with data of a second data transmission into a combined data transmission, and wherein the bandwidth manager is configured to save power by delaying transmission of the first isochronous data transmission and reducing the number of isochronous data transmissions to satisfy the data transmission policy.

21. The article of manufacture of claim 19, wherein obtaining a plurality of bandwidth requests includes polling a plurality of isochronous applications corresponding to the plurality of isochronous devices, and wherein the combined data packet transmission is a single databurst transmission during a single time of data of the at least two isochronous data packets appended at endpoints of the data; and further comprising data to cause the bandwidth manager to:

determine when to transmit the combined data packet transmission according to the data transmission policy, and wherein the power managed profile is based on maximizing the life of a battery of a computer.

22. The article of manufacture of claim 19, further comprising:
data to cause the bandwidth manager to manage delaying transmission of a third and of a fourth isochronous data packet transmission, and to manage combining data of the third and fourth isochronous data packet transmissions with data of an asynchronous data packet transmission into the combined data packet for transmission.

23. A device comprising:
a bandwidth manager of a computer system configured to:
apportion at least a portion of a total memory bandwidth available for a time period amongst a plurality of digital video data or digital audio data bandwidth requests for the time period for a plurality of isochronous devices, according to a power managed profile, wherein apportioning includes dividing the total andwidth into a plurality of portions of the total memory bandwidth;
determine when to combine data of at least two isochronous data packet transmissions of digital video data or digital audio data into a combined data packet transmission, based on the power managed profile; and
satisfy at least two of the plurality of bandwidth requests each with at least one of the plurality of portions of the total memory bandwidth by appending endpoints of the data of the at least two isochronous data packet transmissions to form the combined data packet transmission.

24. A device comprising:
a bandwidth manager of a computer system configured to:
apportion at least a portion of a total memory bandwidth available for a time period amongst a plurality of digital data bandwidth requests for the time period for a plurality of isochronous devices, according to a power managed profile, wherein apportioning includes dividing the total memory bandwidth into a plurality of portions of the total memory bandwidth;
determine when to combine data of at least two isochronous data packet transmissions of digital data into a combined data packet transmission, based on the power managed profile; and
satisfy at least two of the plurality of bandwidth requests each with at least one of the plurality of portions of the total memory bandwidth by appending endpoints of the data of the at least two isochronous data packet transmissions to form the combined data packet transmission.

* * * * *